Nov. 19, 1929.  C. C. BERG  1,736,572
FLOOR MAT FOR AUTOMOBILES
Filed Sept. 29, 1926
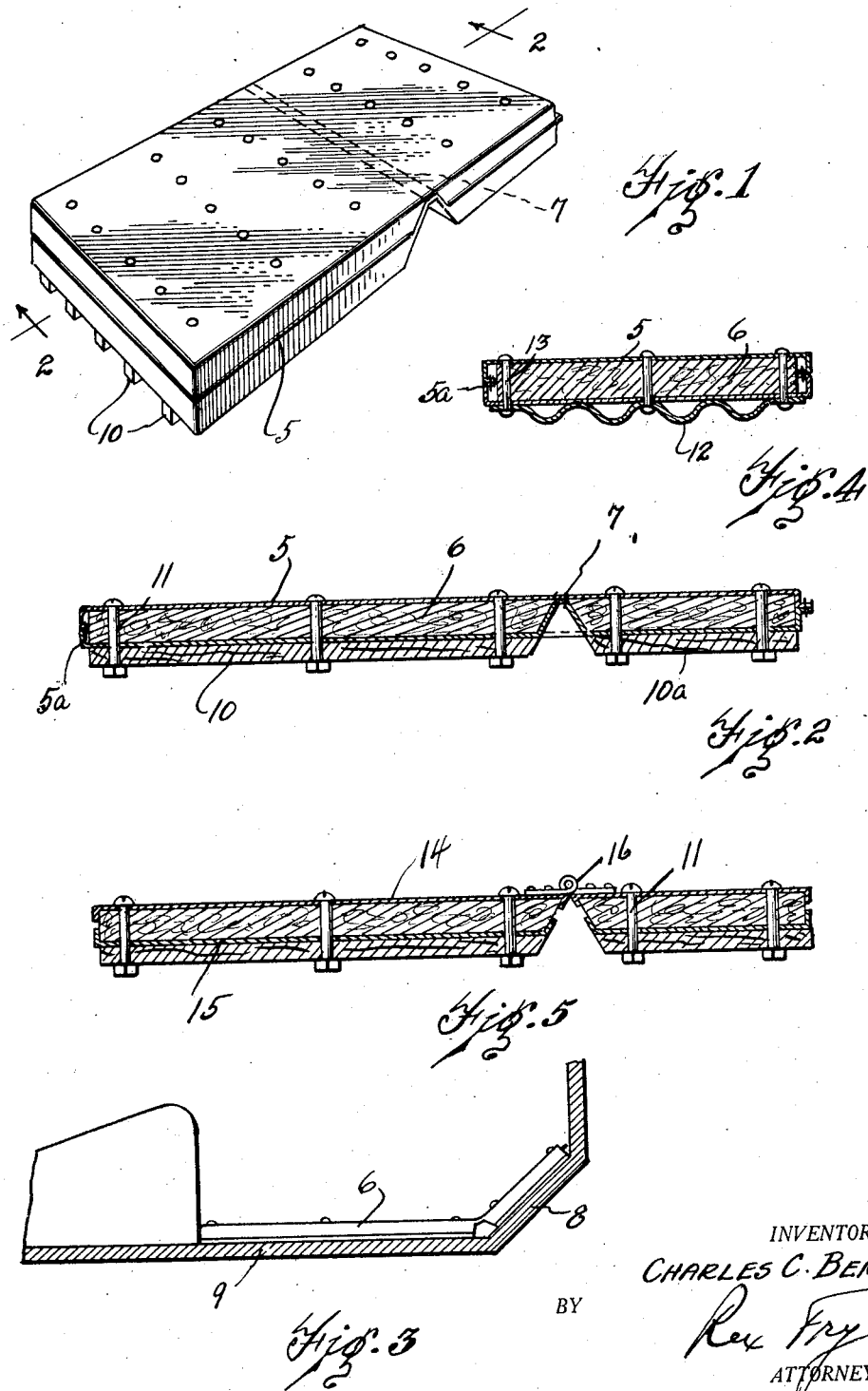
INVENTOR.
CHARLES C. BERG
BY
ATTORNEY.

Patented Nov. 19, 1929

1,736,572

UNITED STATES PATENT OFFICE

CHARLES C. BERG, OF DETROIT, MICHIGAN

FLOOR MAT FOR AUTOMOBILES

Application filed September 29, 1926. Serial No. 138,415.

This invention relates to floor mats for preventing the heat of the floor boards of automobiles from reaching the feet of those occupying the front seat and more particularly of the occupant of the seat beside the driver.

It is a well-known fact that the floor boards of automobiles adjacent the engine become uncomfortably hot when the engine is continuously run for a long period, as on tours during the summer months. That portion of the floor board that is ordinarily inclined to the horizontal is particularly adapted to be heated by the engine, and it is upon such inclined floor portion that the majority of occupants of the front seats of automobiles place their feet. The portion of the floor board directly in front of the driver is cooled to some extent by the passage of air through the openings for the pedals and other members, but the portion of the floor board in front of the other occupant or occupants of the front seat is not ordinarily relieved by such openings or otherwise, with the result that such portion of the floor board becomes increasingly hot as the engine continues running.

One of the objects of my invention is the provision of a floor mat that may be conveniently arranged upon the floor board in front of the front seat to prevent the transmission of heat from the floor board to the feet of the occupants of the front seat.

Another object of my invention is the arrangement of a floor mat for automobiles that will fit upon the floor boards of practically all automobiles, regardless of the angle of inclination between the horizontal and oblique portions of the floor board.

A further object of my invention is the provision of a floor mat that may be readily positioned upon the floor board of an automobile and as readily removed therefrom whenever desired, the floor mat being constructed and arranged to permit the circulation of air between the floor board and the major portion of the mat.

Other objects and advantages will be apparent from the following description, wherein reference is made to the accompanying drawings illustrating preferred embodiments of my invention and wherein similar reference numerals designate similar parts throughout the several views.

In the drawings:

Fig. 1 is a perspective view of a floor mat constructed in accordance with my invention.

Fig. 2 is a longitudinal section therethrough, taken substantially on the line 2—2 of Fig. 1.

Fig. 3 is a side elevation of my floor mat in position upon the floor board of an automobile, the floor board being shown in section.

Fig. 4 is a detail cross section through a modified embodiment of my improved floor mat, and Fig. 5 is a cross section through another modified embodiment of my invention.

Referring now to the drawings, the numeral 5 designates the outer covering of my improved floor mat, which is preferably formed of canvas or other suitable fabric to enclose a pair of spaced slabs 6 of asbestos, fiber composition or other materials that are poor conductors of heat. The preferred method of forming my improved floor mat is to form the outer covering 5 as a shallow bag stitched on three sides and then turned so that the seams $5^a$ are within the bag. Then the larger asbestos slab 6 is placed within the covering and the upper and lower sheets of the bag 5 stitched together, as at 7, to hold the larger slab 6 in position. The smaller slab 6 is then inserted within the bag above the stitching 7 and then the open end of the bag is closed, as by stitching. The upper and lower slabs 6 are thus separated from each other by a portion of the bag 5, and such intermediate portion of the bag serves as a hinge to enable the ready swinging of one of the slabs relatively to the other. This enables the smaller slab 6 to assume any desired angle relatively to the larger slab and so permit the smaller slab to lie upon variously inclined oblique portions 8 of the floor boards 9 of automobiles. In Fig. 3 I have shown the position assumed by my improved floor mat when placed upon the floor board of an automobile. The larger slab 6 lies upon the horizontal portion of the floor board while the smaller slab extends angularly therefrom so as to lie upon the inclined portion 8 of the floor board. In Fig. 3 the rear extremity of the slab 6 is shown as contacting the front wall of the front seat, but it will be understood that such contact is not necessary, and that, if desired, the larger slab 6 may cover only part of the floor board between the front seat and the lower portion of the inclined floor board 8.

To stiffen the floor mat and also provide means for spacing the major portion of the floor mat from the floor board of the automobile, I preferably provide spaced reinforcing strips 10 upon the bottom of the floor mat, securing them to the mat by bolts 11 or other suitable fastening means. The reinforcing strips 10ª below the smaller slab 6 of the floor mat are entirely separate from the spacer strips 10 below the larger slab 6, so that the spacer strips will not interfere with the movements of the smaller slab relatively to the larger. The fastening members 11 serve to securely fasten the slab 6 and the reinforcing strips 10 and 10ª respectively together and the the nuts on the lower end of the fastening members 11 provide raised studs to prevent contact of the floor board and the reinforcing strips 10, thus also preventing the transfer of heat of the floor board into the reinforcing strips 10 and through these into the floor mats, thereby adding to the ventilation between the mats and the floor board.

In Fig. 4 I have shown a modified form of spacer strips comprising corrugated metal spacer members 12 secured to the floor mat by rivets 13 or other suitable fastening members. One strip of corrugated metal 12 is secured beneath the smaller slab 6 of the floor mat while one or more corrugated strips may be secured beneath the larger slab of the floor mat. The heads of the rivets 13 preferably project above the upper canvas covering 5 of the floor mat and serve to protect such covering from tearing, etc.

In Fig. 5 is shown another modification of my improved floor mat wherein the slabs are secured between upper and lower metallic cover plates 14 and 15 respectively. Each slab is preferably separately covered with flanged upper and lower metallic plates and the spacer strips secured thereto. Then the adjacent edges of the upper cover plates for the two slabs are joined by means of a hinge connection 16 to permit swinging of one slab relatively to the other.

In practice, the spacer strips 10 or 12 rest upon the floor board of the automobile and raise the major portion of my improved floor mat from the floor board of the automobile, thereby providing a space between the floor board and floor mat for the circulation of air. This air circulation, as well as the greater distance between the floor mat and floor board serves to further prevent the transmission of heat from the floor board to the floor mat.

While it will be apparent that the illustrated embodiments of my invention herein disclosed are well calculated to adequately fulfill the objects and advantages primarily stated, it is to be understood that the invention is susceptible to variation, modification and change within the spirit and scope of the subjoined claims.

Having described my invention, I claim:

1. A floor mat for automobiles comprising a pair of spaced slabs, a fabric covering therefor, the fabric covering being stitched between the slabs to form a flexible joint permitting angular movement of one slab relatively to the other, and reinforcing strips engaging the lower face of such covering below both slabs and extending from front to rear of the slabs.

2. A floor mat for automobiles comprising a pair of spaced slabs, a fabric covering therefor, the fabric covering being stitched between the slabs to form a flexible joint permitting angular movement of one slab relatively to the other, and spaced reinforcing strips contacting the lower face of such covering and secured by fastening means passing through the slabs and covering.

3. A floor mat for automobiles comprising a pair of spaced slabs, a fabric covering therefor, the fabric covering being stitched between the slabs to form a flexible joint permitting angular movement of one slab relatively to the other, and laterally spaced reinforcing strips engaging the lower face of such covering below both slabs, the reinforcing strips being arranged to space the slabs from the floor boards of automobiles to permit circulation of air between the floor boards and slabs.

In witness whereof I hereunto set my hand.

CHARLES C. BERG.